(12) United States Patent
Keller et al.

(10) Patent No.: US 8,619,675 B2
(45) Date of Patent: Dec. 31, 2013

(54) TECHNIQUE FOR EMERGENCY SESSION HANDLING IN A COMMUNICATION NETWORK

(75) Inventors: Ralf Keller, Wurselen (DE); Andreas Witzel, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 250 days.

(21) Appl. No.: 13/059,616

(22) PCT Filed: Aug. 18, 2008

(86) PCT No.: PCT/EP2008/006784
§ 371 (c)(1),
(2), (4) Date: Feb. 17, 2011

(87) PCT Pub. No.: WO2010/020261
PCT Pub. Date: Feb. 25, 2010

(65) Prior Publication Data
US 2011/0141979 A1    Jun. 16, 2011

(51) Int. Cl.
*H04W 4/00* (2009.01)
(52) U.S. Cl.
USPC .................. 370/328; 370/352; 455/404.1
(58) Field of Classification Search
USPC ............ 370/259, 352, 354–358, 329–338; 455/404.1, 404.2
See application file for complete search history.

(56) References Cited

U.S. PATENT DOCUMENTS

2007/0254625 A1    11/2007  Edge
2009/0296689 A1*   12/2009  Bakker et al. ................. 370/352

FOREIGN PATENT DOCUMENTS

WO    WO 2007/072462 A    6/2007
WO    WO2007072462   *    6/2007

OTHER PUBLICATIONS

3GPP TR 23.826 V0.4.0, (Jan. 2008), (Release 8). 3rd Generation Partnership Project; Feasibility Study on Voice Call Continuity Support for Emergency Calls.*
3GPP: "3rd Generation Partnership Project: Technical Specification Group Services and System Aspects; Feasibility Study on Voice Call Continuity Support for Emergency Cii s (Refeese 8)" 3GPP Draft ; 23826-040-CLEAN, $3^{rd}$ Generation Partnership Project (3GPP), Mobile Competence Centre . 650, Route Des Lucioles, F-06921 Sophia-Antipous Cedex France, vol. SA WG2. No. Jeju; 20080407. Jan. 21, 2008, XP050264370 paragraphs [06.1], [06,4]: figures 6.2. 1-2.

* cited by examiner

*Primary Examiner* — Ricky Ngo
*Assistant Examiner* — Iqbal Zaidi (57) ABSTRACT

Techniques of emergency session handling in a communication network are provided, in which a packet switched network control function configured to handle emergency sessions established from a user equipment via a packet switched network access, e.g. an Emergency Call Session Control Function (E-CSCF), is associated with a switching control node of a circuit switched network. The switching control node is capable of handling emergency session established via a circuit switched network access, e.g. a Mobile Switching Center Server (MSC-S) of a mobile network. Handling of emergency sessions established via the packet switched network access is forwarded from the packet switched network control function to the associated switching control node.

9 Claims, 6 Drawing Sheets

TECHNIQUE FOR EMERGENCY SESSION HANDLING IN A COMMUNICATION NETWORK

TECHNICAL FIELD

The present invention relates to techniques for emergency session handling in a communication network, in particular emergency sessions via a packet network access and in embodiments to session continuity when roaming between a packet network access and a circuit switched network access.

BACKGROUND

Mobile networks are currently evolving from pure circuit switched networks towards IP based networks, and by that seamlessly integrate into IP (Internet Protocol) based infrastructures that are also used for the Internet, the World Wide Web and the data communication industry.

With this trend mobile networks follow the evolution steps of the wireline networks, where VoIP (Voice over IP) via DSL (Digital Subscriber Line) access or via WLAN (Wireless Local Area Network) access is existing technology today.

Mobile operators that install IMS (IP Multimedia Subsystem) networks and offer IMS services, want to make these services available also to GSM/WCDMA subscribers. Hereto, calls from and to this group of GSM/WCDMA subscribers need to be routed through the IMS network in order to reach the IMS service engine. This concept is called (MS Centralized Services (ICS). The (MS centralized Services work item in 3GPP targets at using the circuit switched access for access to IMS services, see 3GPP TS 23.292, and is complemented by IMS Service Continuity, see 3GPP TS 23.237. Telephony services using the IMS network are also referred to as MMtel (Multimedia Telephony) services.

In parallel to the above trend, the packet core is evolving (Evolved Packet Core, EPC) as part of the Evolved Packet System (EPS), supporting eUTRAN as new radio access network. As part of this discussion, work on Single Radio Voice Call Continuity (SR-VCC) is ongoing in 3GPP SA2 (see 3GPP TS 23.216), enabling to transfer an IMS voice call from EPS to the circuit switched domain and vice versa.

When a user of MMTel services issues an emergency call via a packet switched access, i.e. an IMS Emergency Call, the emergency call is routed to a P-CSCF (Proxy Call Session Control Function) in the visited network. This P-CSCF detects the emergency call and routes it to the E-CSCF (Emergency CSCF) in the visited network. The E-CSCF is configured to handle emergency call sessions, which typically involves identifying a Public Safety Answering Point (PSAP) or an emergency centre.

Here, it should be noted that the E-CSCF is always in the network where the subscriber is roaming. So if the subscriber is roaming in a visited network, also the E-CSCF is located in the visited IMS network. The E-CSCF either routes it to an IP capable PSAP or via a BGCF (followed by a MGCF etc.) to a PSAP in the circuit switched domain. In this respect, it should be noted that presently a PSAP is typically not implemented with IP capabilities, so that emergency calls are typically routed via the circuit switched domain.

Due to the above concepts of handling emergency sessions and legal obligations, it is necessary for the operator of a visited network to provide an IMS infrastructure for IMS roamers, even if the operator does not offer IMS services for own subscribers.

Accordingly, there exists a need to provide an efficient technique for handling emergency calls established via a packet switched network access.

Further, the simple support of IMS Emergency Calls is not enough in order to fulfill the legal requirements of many countries. It may further be required that an established emergency call is maintained, also when roaming in/out of the IMS capable packet switched radio access. This handover is covered for normal speech calls by the 3GPP features "IMS Service continuity" and "SR-VCC". In both cases the call is anchored in an IMS application server such as described e.g. in 3GPP TS 23.216 and 3GPP TS 23.237.

Accordingly, there is also a need for providing session continuity of emergency calls established via a packet switched network access, e.g. using IMS services, when the user equipment from which the emergency call issued roams to a circuit switched network access or vice versa.

SUMMARY

According to an embodiment of the invention, a packet switched network control function configured to handle emergency sessions established from a user equipment via a packet switched network access, e.g. an Emergency Call Session Control Function (E-CSCF) of an IMS network, is associated with a switching control node of a circuit switched network, e.g. a Mobile Switching Center of a mobile network. The switching control node of the circuit switched network is configured to handle emergency sessions established from the user equipment via a circuit switched network access.

In a method according to an embodiment of the invention, an emergency session established from the user equipment via the packet switched network access is forwarded to the associated switching control node of the circuit switch network which then accomplishes handling of the emergency session and establishes a connection between the user equipment and an emergency answering point, e.g. a public safety answering point (PSAP).

In a method according to a further embodiment of the invention, an emergency session is established between the user equipment and an emergency answering point via the circuit switched network access and the switching control node. A further leg of the emergency session is established from the user equipment via the packet switched network access to the switching control node. In the switching control node, the emergency session established from the user equipment via the circuit switched network access is identified, and a session transfer operation is performed by connecting an ongoing leg of the identified emergency session, the ongoing leg extending from the switching control node to the emergency answering point, to the further leg of the emergency session.

DETAILED DESCRIPTION OF EMBODIMENTS

In the following, the invention will be explained in more detail by referring to exemplary embodiments which relate to handling of emergency sessions in a communication network. In the illustrated embodiments, the communication network comprises a circuit switched domain with a mobile network, e.g. a GSM/WCDMA network. Further, the communication network comprises a packed switched domain with an IMS network. The circuit switched domain provides a circuit switched network access, and the packet switched domain provides a packet switched network access. Both access types may be used by the same user equipment, provided that the user equipment is capable of handling multiple access types. In other embodiments, other types of circuit switched networks or packet switched networks may be used. Further, it is to be understood that the circuit switched domain may actually provide a plurality of different circuit switched network accesses, e.g. via different radio cells, and that the packet switched domain may actually provide a plurality of different packet switched network accesses, e.g. via different local radio networks.

Figure 1:
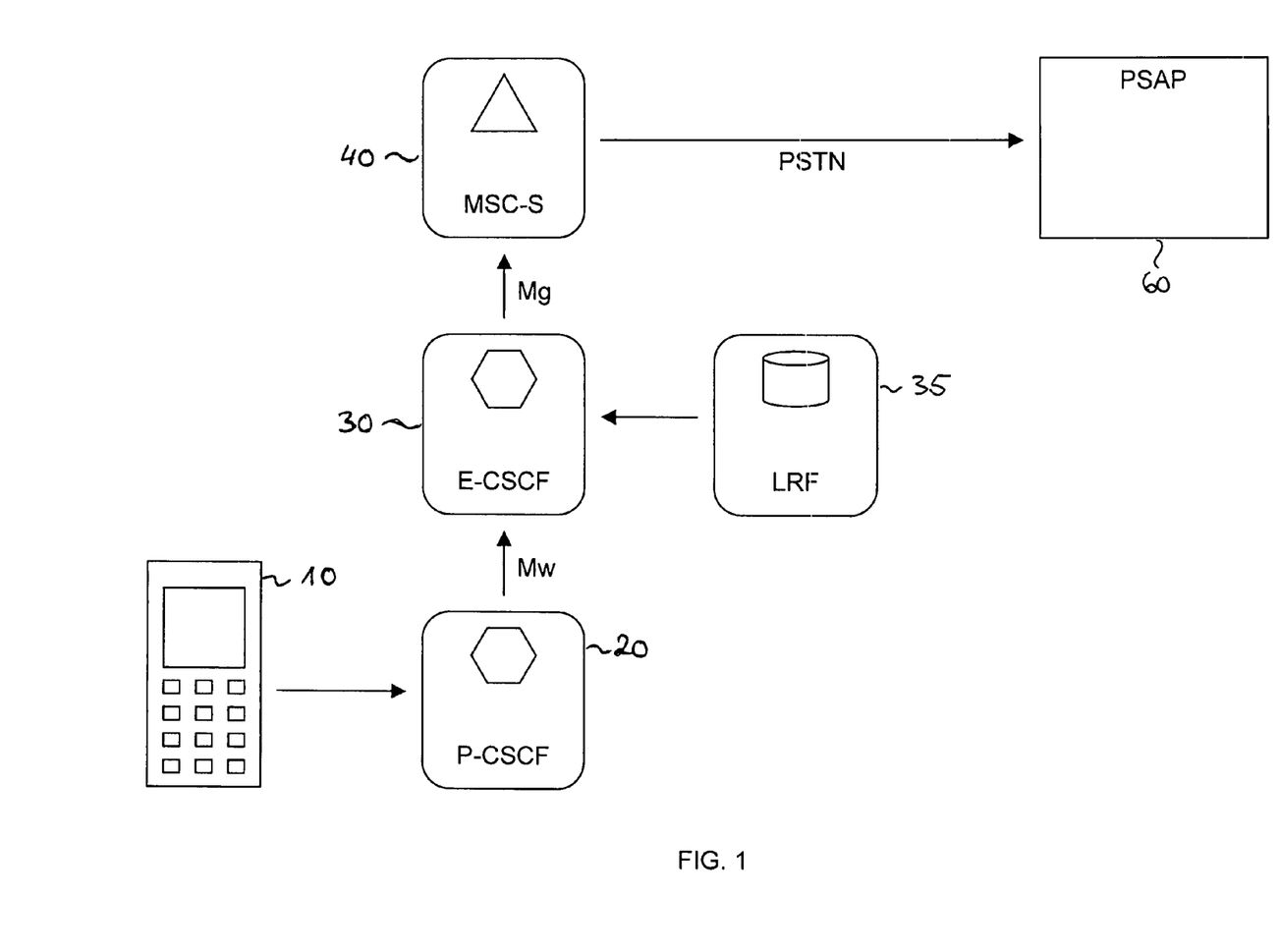
FIG. 1 schematically illustrates a network environment in which emergency sessions are handled in accordance with an embodiment of the invention.

FIG. 1 schematically illustrates a network environment in which emergency sessions are handled in accordance with an embodiment of the invention.

As illustrated, the network environment comprises a user equipment (UE) 10. The UE 10 may be a mobile telephone, a portable computer with multi-radio access capabilities or any other type of mobile electronic device capable of communicating both via a circuit switched network access and via a packet switched network access.

Further, the illustrated network environment comprises a plurality of network components, the network components including a Proxy Call Session Control Function (P-CSCF) 20, an Emergency Call Session Control Function (E-CSCF) 30, a Location Retrieval Function (LRF) 35, and a Mobile Switching Center Server (MSC-S) 40. The P-CSCF 20 is a local packet switched network control function which handles communication sessions established from the UE 10 via the packet switched network access. The E-CSCF 30 is a packet switched network control function which is dedicated for handling emergency sessions established from the user equipment 10 via the packet switched network access. The LRF 35 is a function of the packet switched network which allows for retrieving location information, e.g. the present location of the UE 10. The MSC-S 40 is a switching control node of the circuit switched network. Accordingly, the P-CSCF 20, the E-CSCF 30, and the LRF 35 can be considered to be part of the packet switched domain, whereas the MSC-S 40 is part of the circuit switched domain.

The UE 10 may be interfaced with respect to the P-CSCF 20 via a wireless network, e.g. a WiFi network, a WLAN network, or a WiMAX network. An interface between the P-CSCF 20 and the E-CSCF 30 is denoted by Mw, and an interface between the E-CSCF 30 and the MSC-S is denoted by Mg. The latter interfaces are defined in the 3GPP TS.

Further, the network environment comprises a public safety answering point (PSAP) 60. The PSAP 60 is an emergency answering point or emergency center (e.g., an 112 emergency call operator or a 911 emergency call operator). The PSAP 60 is connected to the MSC-S 40 via a Public Switched Telephone Network (PSTN) interface. In other embodiments, the PSAP 60 may be coupled to the MSC-S 40 via an Integrated Service Digital Network (ISDN) interface.

Unless mentioned otherwise in the following description, the P-CSCF 20, the E-CSCF 30, the LRF 35, the MSC-S 40 may operate as defined in the 3GPP TS. It is to be understood that the described structure of the network components 20, 30, 35, and 40 is merely illustrative. In other embodiments, some of the above-mentioned functions could be integrated in a single network component, e.g. the E-CSCF 30 and the P-CSCF 20. Further, as will be explained in more detail in the following, according to some embodiments, the E-CSCF 30 and the MSC-S 40 may be integrated within a single network component. Further, the MSC-S 40 could be replaced by other types of Mobile Switching Center (MSC) components.

As will be further explained in the following, according to some embodiments of the invention, the MSC-S 40 is associated with the E-CSCF 30. According to some embodiments, this can be accomplished by providing the E-CSCF 30 and the MSC-S 40 in separate network components and by uniquely assigning the E-CSCF 30 to the MSC-S 40. In some embodiments, the E-CSCF 30 and the MSC-S 40 may be co-located, i.e. provided at the same location, or even integrated within a single network component. In this case the E-CSCF 30 may be associated with the MSC-S 40 by providing a dedicated interface there between. In this way, the existing infrastructure and interfaces of the MSC-S 40 may also be used for handling of emergency calls established via the packet switched network access, by forwarding handling of the emergency session from the E-CSCF 30 to the associated MSC-S 40. The MSC-S 40 can then handle the emergency session received from the associated E-CSCF 30 as an emergency session established via the circuit switched network access, i.e. the MSC-S 40 performs control signaling associated with the set-up of the circuit switched leg of the emergency session. Handling of the emergency session in the MSC-S 40 typically involves also identifying the responsible PSAP 60 on the basis of the location of the UE 10.

Further, according to some embodiments of the invention, also a session continuity (SC) function may be integrated with the MSC-S 40. In this way, emergency sessions established via the packet switched network access are anchored at the MSC-S 40. In this way, roaming from a packet switched network access to a circuit switched network access and/or vice versa can be supported. According to some embodiments, the session continuity function may be used for both emergency sessions and other types of sessions, thereby allowing for an efficient implementation of the SC function.

Figure 2:
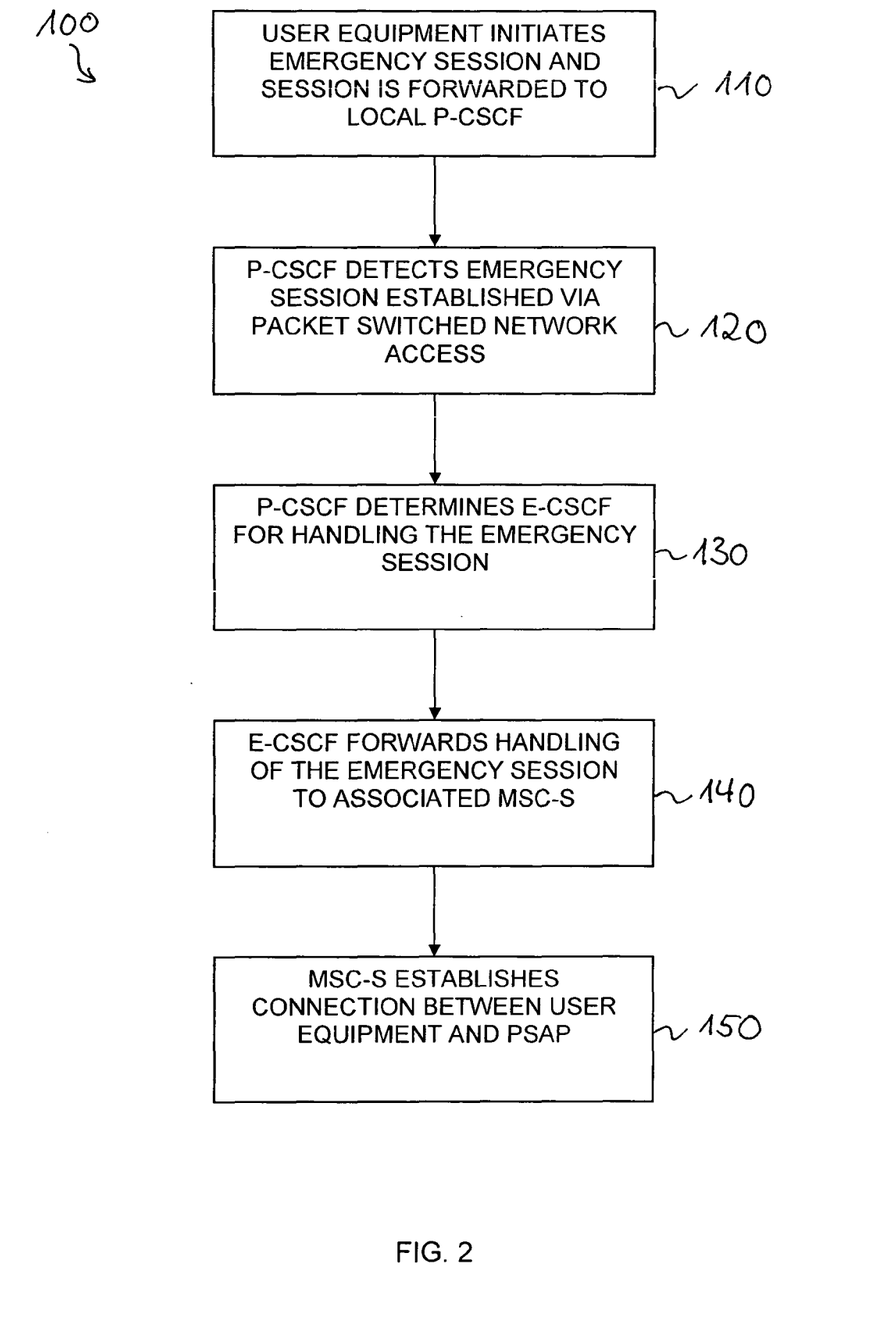
FIG. 2 shows a flowchart for schematically illustrating a method for handling emergency sessions according to an embodiment of the invention.

FIG. 2 schematically illustrates an embodiment of a method 100 for handling of emergency sessions in the network environment of FIG. 1. The method comprises steps 110, 120, 130, 140, and 150. It is to be understood that in other embodiments the illustrated steps may be supplemented by additional steps or modified as appropriate in order to meet the requirements of specific applications. Further, it is to be understood that the steps and related functions are not necessarily to be performed in the illustrated order but may be rearranged as appropriate.

In step 110, the UE 10 initiates an emergency session, i.e. an IMS Emergency Call. The session is forwarded to the P-CSCF 20 responsible for local services.

In step 120, the P-CSCF 20 detects that the incoming session is an emergency session and routes the session to the associated E-CSCF 30.

In step 130, the E-CSCF 30 determines the associated MSC-S 40, e.g. based on an address identifier stored in a memory of the E-CSCF 30. Further, when the E-CSCF 30 and the MSC-S are co-located, the associated MSC-S 40 may be predetermined by providing a dedicated interface between the E-CSCF 30 and the MSC-S 40 or by integrating the E-CSCF 30 with the MSC-S 40.

In step 140, the E-CSCF 30 forwards handling of the emergency session to the associated MSC-S 40. According to an embodiment, the E-CSCF 30 steers the incoming emergency session directly to the associated MSC-S 40 for further handling. According to other embodiments, some operations relating to the handling of the emergency session may also be accomplished by the E-CSCF 30, e.g. collecting information relating to the emergency session.

According to an embodiment, the E-CSCF 30 may indicate to the MSC-S 40 that the forwarded session is an emergency session. According to a further embodiment, but the MSC-S 40 may alternatively or in addition be configured to detect emergency sessions. For example, the MSC-S 40 may detect an IMS Emergency Call by analyzing a destination "tel URI" address, e.g. a E.164 emergency number, such as "112" or a SIP URI such as "emergency@myhome.net".

After detecting that the incoming session is an emergency session, in step 150, the MSC-S 40 establishes a connection between the UE 10 and the PSAP 60 using the existing interface of the MSC-S 40 with respect to the PSAP 60. According to an embodiment these actions correspond to the handling of emergency calls established via the circuit switched network access.

According to an embodiment, also information relating to the emergency session is forwarded from the E-CSCF 30 to the MSC-S 40. This information may be stored by the MSC-S 40, e.g. in an associated database, and may be used by the MSC-S 40 when handling the emergency session. For example, the information relating to the emergency session may include a location information (e.g. serving radio cell identity). From the MSC-S 40, the information received from the E-CSCF 30 may be forwarded to the PSAP 60, similar as for emergency calls originating in the circuit switched'domain.

According to an embodiment, the MSC-S 40 may also store an indication that the emergency call has been originated via a packet switched access or from an E-CSCF as information relating to the emergency session.

According to an embodiment, for cases in which the UE 10 is not in radio coverage and using e.g. a wireline in-building access, the E-CSCF 30 may contact the LRF 35 to determine the location of the UE 10. Alternatively or in addition, the location of the UE 10 can be determined by reusing existing internal functions and information of the MSC-S 40, which are typically provided for handling services of the circuit switched domain. For example, the received or stored originating identity can be analyzed by the MSC-S 40 to determine the corresponding location of the emergency session. A precise originating identity is desirable to allow for call-back of the PSAP 60. By reusing existing internal functions of the MSC-S 40, use of the LRF 35 can be avoided.

According to an embodiment, the LRF 35 can be integrated in the MSC-S 40 without significant additional outlay, since the MSC-S 40 has anyway the geographical radio network layout and the local numbering plan administered. The integrated LRF 35 can then be used by other services of the packet switched network or by other services of the circuit switched network.

If the PSAP 60 requests location information from the MSC-S 40, this location information can be provided by the MSC-S 40 as for emergency calls originating in the circuit switched domain, which allows to reuse existing mechanisms and interfaces of the MSC-S 40.

In the above embodiment, the E-CSCF 30 may be a dedicated, stand-alone node, may be co-located with any other Call Session Control Function (CSCF) of the packet switched network, or may be integrated with the MSC-S 40 serving the local geographical area where the UE 10 is currently roaming. The latter alternative is illustrated in FIG. 3.

Figure 3:
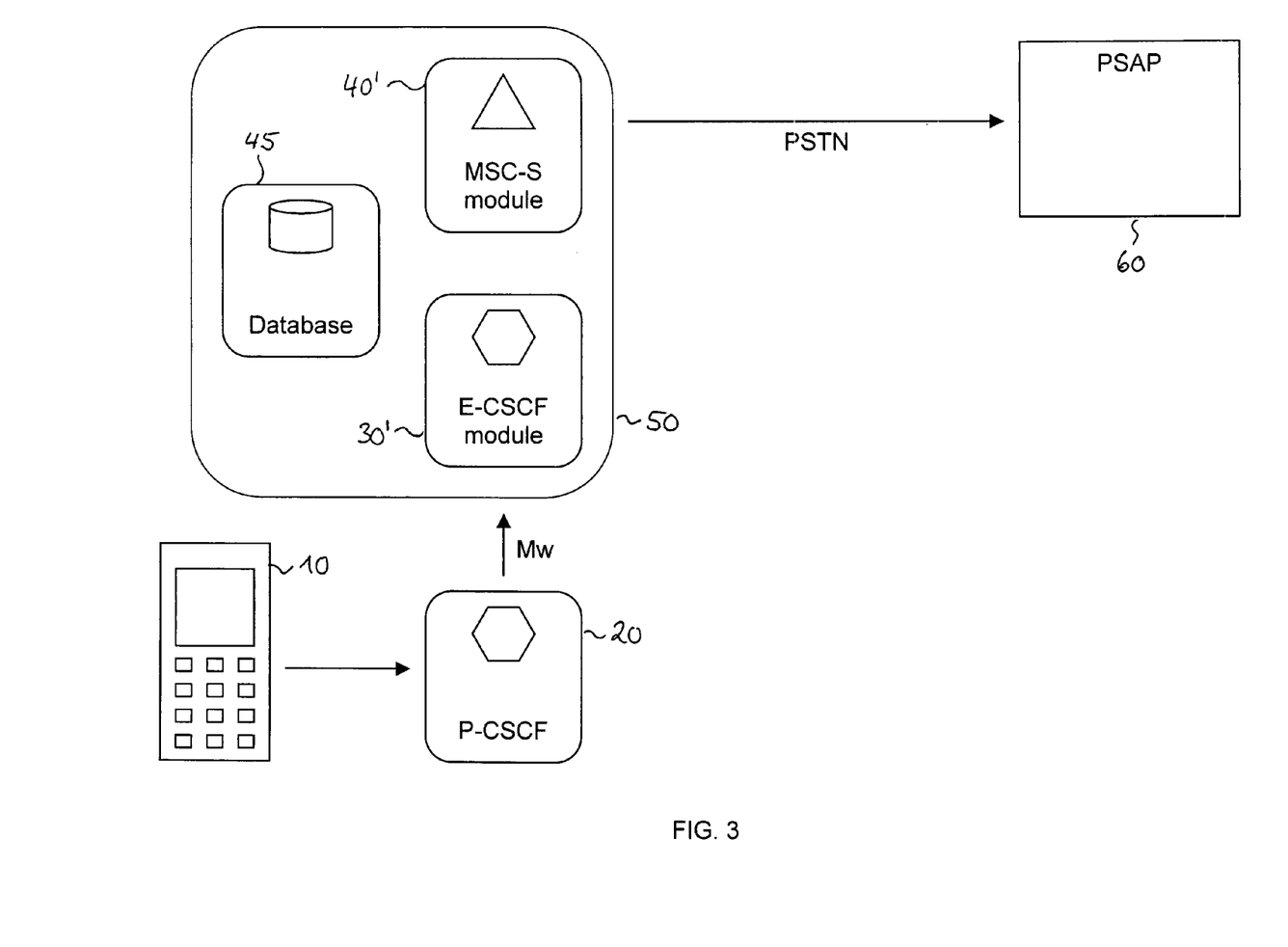
FIG. 3 schematically illustrates a network environment in which emergency sessions are handled in accordance with a further embodiment of the invention.

FIG. 3 schematically illustrates an embodiment of the invention in which an enhanced MSC-S 50 includes an E-CSCF module 30' and a MSC-S module 40'. These modules are configured to accomplish similar functions as the E-CSCF 30 and MSC-S 40 of FIG. 1. Other components and operations of this embodiment correspond to those as illustrated in FIG. 1 and have been designated with the same reference signs. For details concerning the operation of this embodiment, reference can thus be made to the above explanations with respect to FIGS. 1 and 2.

As further illustrated in FIG. 3, the enhanced MSC-S 50 also comprises a database 45. As explained in connection with FIG. 2, the database 45 may be used for storing information relating to the emergency session established via the packet switched network access. The information stored in the database may include a location information (e.g. serving radio cell identity). The stored information may be received from the E-CSCF module 30' or may be generated on the basis of information received from the E-CSCF module 30'. Further, the database 45 may also store information relating to emergency sessions established via a circuit switched network access. In this way, infrastructure of the enhanced MSC-S 50 may be efficiently used for both handling of emergency sessions established via a packet switched network access and handling of emergency sessions established via a circuit switched network access.

Figure 4:
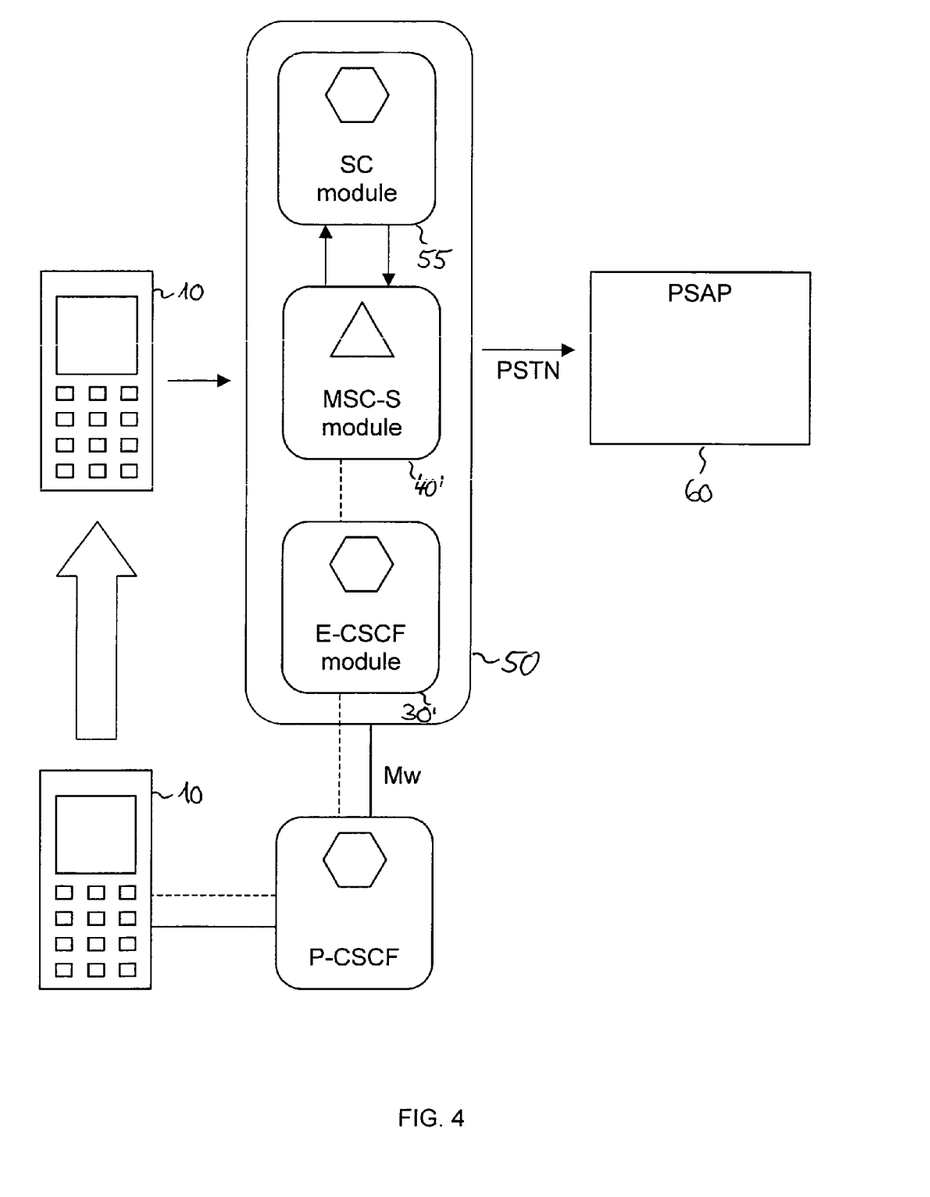
FIGS. 4 and 5 schematically illustrate a network environment in which session continuity of emergency sessions is accomplished in accordance with an embodiment of the invention.
Figure 5:
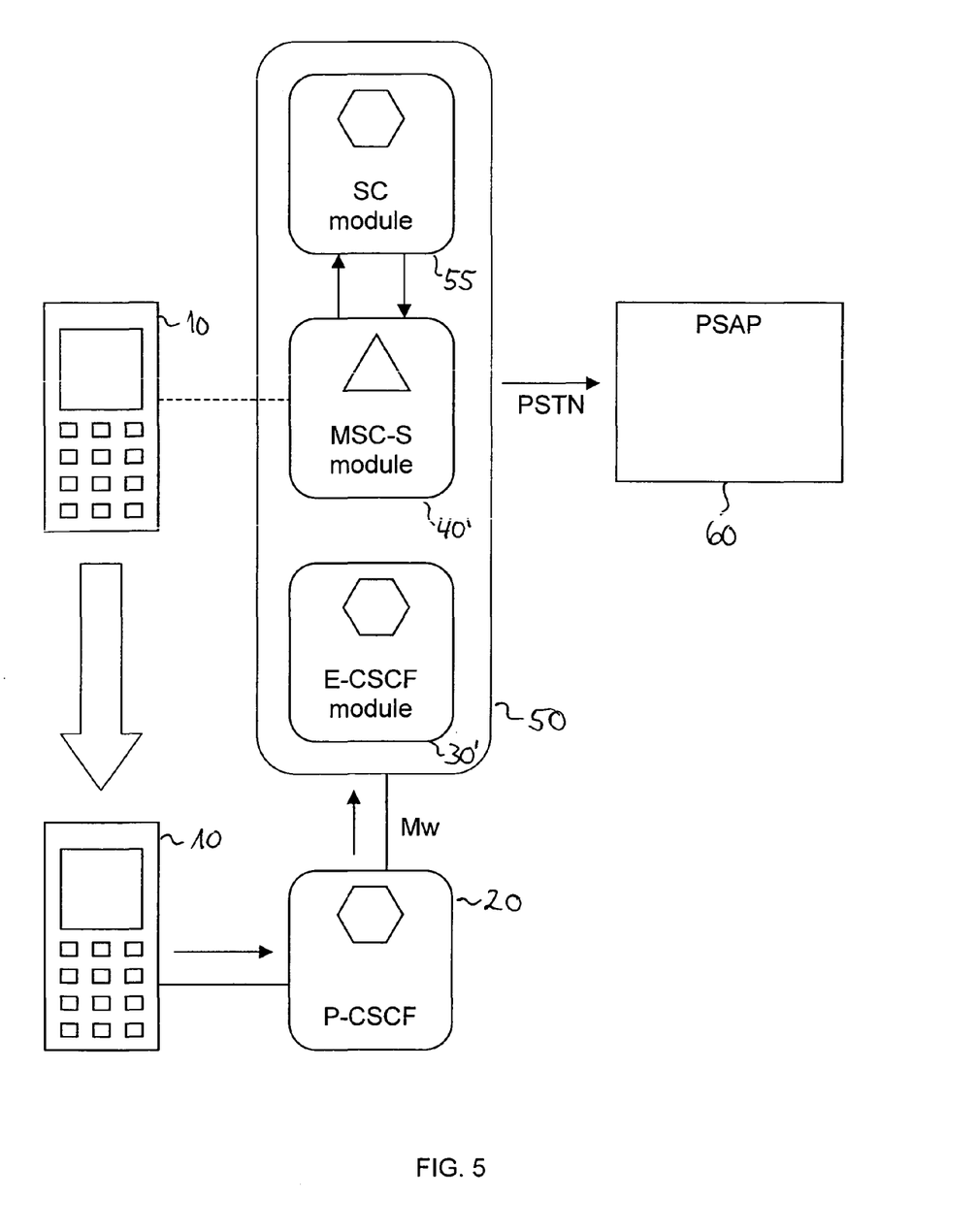

In FIGS. 4 and 5, a further embodiment of the invention is illustrated, in which the enhanced MSC-S 50 is further provided with a session continuity (SC) module 55. The SC module 55 is configured to control maintaining continuity of an existing emergency session when the UE 10 roams from a packet switched network access to a circuit switched network access and/or vice versa. FIG. 4 illustrates the case of roaming from a packet switched network access to a circuit switched network access, and FIG. 5 illustrates the case of roaming from a circuit switched network access to a packet switched network access. In FIGS. 4 and 5, components which correspond to those of FIGS. 1 and 3 have been designated with the same reference signs. For further details concerning the operation of these components, reference can thus be made to the above explanations with respect to FIGS. 1-3. In FIGS. 4 and 5, the database 45 of FIG. 3 is not illustrated. However, it is to be understood that the enhanced MSC-S 50 of FIGS. 4 and 5 may comprise the database 45 as well.

The SC module 55 may operate in accordance with the principles as described in 3GPP TS 23.237.

Accordingly, in this embodiment, an SC function or SC anchor resides in the enhanced MSC-S 50. In this way, emergency sessions established via the packet switched access, i.e. IMS Emergency Calls, are anchored in the local serving enhanced MSC-S 50.

In the following, operations according to an embodiment of the invention will be explained with reference to FIG. 4, which relates to a situation when the UE 10 roams from a packet switched network access to a circuit switched network access while an emergency session is going on.

In this situation, an emergency session is already established from the UE 10 to the PSAP 60 via the packet switched network access, but a change to the circuit switched network access may be required or desirable, e.g. due to poor radio coverage of the packet switched network access. The ongoing emergency session thus has a first leg, extending from the UE 10 via the packet switched network access to the enhanced MSC-S 50, in particular to the MSC-S module 40', and a second leg extending from the enhanced MSC-S 50, in particular the MSC-S module 40', to the PSAP 60.

When the UE 10 moves out of packet switched network coverage into circuit switched network coverage and decides to perform session transfer from the packet switched network access to the circuit switched network access, a third leg of the emergency session is established, the third leg extending from the UE 10 via the circuit switched network access to the enhanced MSC-S 50, in particular to the MSC-S module 40'.

According to an embodiment, the UE 10 initiates a session transfer request towards the SC module 55 via the circuit switched network access. The session transfer request may trigger establishing the third leg of the emergency session or may be initiated after the third leg of the emergency session has been established.

According to an embodiment, the session transfer request initiated by the UE 10 is based on circuit switched control signaling issued by the UE 10 with respect to the enhanced MSC-S 50 via the circuit switched network access and may include a session transfer identifier in the form of a Session Transfer Number (STN).

According to a first option, the session transfer identifier may be of a type dedicated for emergency sessions, e.g. a special Emergency STN (E-STN) for emergency calls. In this case, it is directly indicated to the SC module 55 that this transfer request is for an emergency session. The operator may define a separate set of session transfer identifiers just for the handling of emergency sessions, and the UE 10 may store and use different session transfer identifiers depending on whether the session to be transferred is an emergency session or any other type of session.

According to a second option, the session transfer identifier may be of a generic type applying to both emergency sessions and other types of sessions. For example, a generic STN may be used, which also applies for normal speech calls. In this case, the SC module 55 checks with the MSC-S module 40' whether the UE 10 has an ongoing emergency session, and the ongoing emergency session established from the UE 10 via the packet switched network access can thus be identified. Typically only one emergency call at a time is allowed for one subscriber or UE 10.

According to a third option, the UE 10 may initiate an additional emergency session via the circuit switched network access, i.e. a normal emergency call, and the enhanced MSC-S 50 detects that this subscriber has an ongoing emergency session established via the packet switched network access and anchored in the MSC-S 50, e.g. using a database 45 as depicted in FIG. 3. In this case, the third leg of the emergency session is established within the additional emergency session.

In each of the above-listed options, the ongoing emergency session is identified within the enhanced MSC-S 50.

When transferring the emergency session from the packet switched access to the circuit switched access, the MSC-S module 40' treats the session transfer request received from the UE 10 substantially like an emergency call received via the circuit switched network access. In the third above-listed option the UE 10 has already marked the session as an emergency session.

The enhanced MSC-S 50 then performs a session transfer operation from the packet switched network access to the circuit switched network access by connecting the leg of the emergency session newly established via the circuit switched network access (the third leg) to the ongoing leg to the PSAP 60 (the second leg). Then, the enhanced MSC-S module 50 or UE 10 may release the leg via the packet switched network access (the first leg) and the associated resources.

The above functions of the session transfer operation are controlled by the SC module 55.

In the following, operations according to an embodiment of the invention will be explained with reference to FIG. 5, which relates to a situation when the UE 10 roams from a circuit switched network access to a packet switched network access while an emergency session is going on.

In this situation, an emergency session is already established from the UE 10 to the PSAP 60 via the circuit switched network access, but a change to the packet switched network access may be required or desirable, e.g. due to poor radio coverage of the circuit switched network access. The ongoing emergency session thus has a first leg, extending from the UE 10 via the circuit switched network access to the enhanced MSC-S 50, in particular to the MSC-S module 40', and a second leg extending from the enhanced MSC-S 50, in particular the MSC-S module 40', to the PSAP 60.

When the UE 10 moves out of circuit switched network coverage into packet switched network coverage and decides to perform session transfer from the circuit switched network access to the packet switched network access, a third leg of the emergency session is established, the third leg extending from the UE 10 via the packet switched network access to the enhanced MSC-S 50, in particular to the MSC-S module 40'.

According to an embodiment, the UE 10 initiates a session transfer request towards the SC module 55 via the packet switched network access.

According to an embodiment, the session transfer request initiated by the UE 10 is based on the Session Initiation Protocol (SIP) and uses a "SIP INVITE" message issued by the UE 10 with respect to the enhanced MSC-S 50 via the packet switched network access and a session transfer identifier in the form of a Session Transfer URI (STI) to identify the ongoing emergency session established via the circuit switched network access. Again, the session transfer identifier may be of a generic type, e.g. an STI used for both emergency and other sessions, or may be of a type dedicated for emergency sessions, e.g. an Emergency STI (E-STI).

According to an embodiment, the third leg is established by the UE 10 establishing an emergency session over the packet switched network access. The enhanced MSC-S module 50 may then detect that the UE 10 has an ongoing emergency session via the circuit switched network access and identify the ongoing emergency session.

The SC module 55 then controls the MSC-S module 40' to perform a session transfer operation from the circuit switched network access to the packet switched network access by connecting the leg of the emergency session newly established via the packet switched network access (the third leg to the ongoing leg to the PSAP 60 (to the second leg). Then, the enhanced MSC-S 50 may release the leg via the circuit switched network access (the first leg) and the associated resources.

Again, the functions of the session transfer operation are controlled by the SC module 55.

According to an embodiment, the P-CSCF 30 in the visited domain routes only requests including an E-STI to the enhanced MSC-S 50 serving the UE 10. In other embodiments all emergency session requests or all session requests may be routed to the enhanced MSC-S 50 serving the UE 10. The UE 10 includes sufficient information into the "SIP INVITE" message to find the serving enhanced MSC-S 50.

Figure 6:
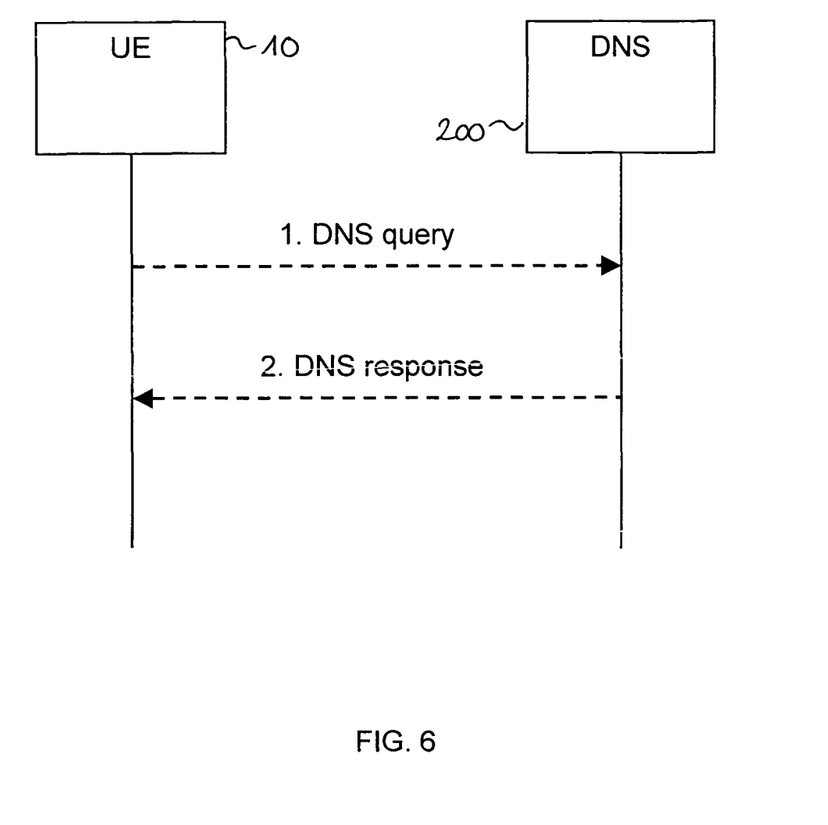
FIG. 6 schematically illustrates a method of discovering a serving switching control node by a user equipment.

FIG. 6 illustrates operations which, according to an embodiment of the invention, are performed to discover the serving enhanced MSC-S 50. In a first step, the UE 10 sends a query to a Domain Name System (DNS) 200 by using the current location of the UE 10 as a key. As a response, the UE 10 then receives a network address of the enhanced MSC-S 50 from the DNS 200.

According to a further embodiment, session continuity of other sessions established via the packet switched network access, e.g. IMS calls in general, can also be anchored in the enhanced MSC-S 50. In this way, session continuity can be maintained also for other sessions, e.g. normal speech calls.

According to an embodiment, if a session transfer request reaches the enhanced MSC-S 50 and there is no ongoing emergency call, then, depending on local policy, the enhanced MSC-C 50 can forward the session transfer request to a corresponding IMS network function as specified in 3GPP TS 23.237 or can treat the session transfer request as well locally and control the session transfer operation by the SC module 55. For this purpose, the session transfer request may be provided with a session transfer identifier of generic type, e.g. a generic STN.

According to the embodiment, the handling of both emergency sessions and other sessions is forwarded to the enhanced MSC-S 50 in the visited domain. If the forwarded session is not an emergency session, the enhanced MSC-S 50 will treat the leg of the session established via the circuit switched network access as a leg of a normal call and not as an emergency call.

Accordingly, embodiments of the invention have been described which allow a network operator to provide emergency services via a packet switched network access, in particular IMS emergency services, for own and roaming subscriber while re-using existing infrastructure of the MSC-S for providing an interface to a PSAP and handling the emergency session. In addition, embodiments have been described which allow for efficiently supporting session continuity for emergency sessions and other sessions when roaming from a packet switched network access to a circuit switched network access or vice versa.

It is to be understood that the above-described embodiments are merely illustrative and susceptible to various modifications. For example, the illustrated functions and components may be replaced by other functions or components having equivalent functionality or additional functions and components may be used. The above concepts may be adapted to various types of packet switched networks and circuit switched networks.

The network components of the above-illustrated embodiments may be implemented by a combination of hardware and software, e.g. by a computer system including a processor and a memory with instructions, the instructions being accessible and processable by the processor so as to accomplish the described functions. The instructions may be stored in a computer-readable storage medium. However, some or all of the recited functions may also be implemented by using dedicated electronic circuits.

Further, it is to be understood, that the features of the above-described embodiments may also be combined with each other as appropriate.

Accordingly, it is to be understood that the present invention is not limited to the embodiments as described and illustrated in the drawings, but also encompasses various rearrangements, modifications and substitutions in the embodiments without departing from the scope of the invention as defined by the appended claims. The invention is thus intended to be limited only by the appended claims and their equivalents.

ABBREVIATIONS

3GPP Third Generation Partnership Project
BGCF Breakout Gateway Control Function
CSCF Call Session Control Function
DSL Digital Subscriber Line
E-CSCF Emergency CSCF
EPC Evolved Packet Core
EPS Evolved Packet System
eUTRAN Evolved UTRAN
GSM Global System for Mobile Communications
ICS IMS Centralized Services
IMS IP Multimedia Subsystem
IP Internet Protocol
ISDN Integrated Services Digital Network
LRF Location Retrieval Function
MGCF Media Gateway Control Function
MSC-S Mobile Switching Centre Server
P-CSCF Proxy CSCF
PSAP Public Safety Answering Point (Emergency Centre)
PSTN Public Switched Telephone Network
SC Session Continuity
SR-VCC Single Radio Voice Call Continuity
STI Session Transfer URI
STN Session Transfer Number
VCC Voice Call Continuity
VoIP Voice over IP
SIP Session Initiation Protocol
TS Technical Specification
UE User Equipment
URI Uniform Resource Identifier
UMTS Universal Mobile Telecommunications System
UTRAN UMTS Terrestrial Radio Access Network
WCDMA Wideband Code Division Multiple Access
WLAN Wireless Local Area Network

The invention claimed is:

1. A network component, in a communication network, comprising:
    a switching control node of a circuit switched network, the switching control node including a session continuity function integrated with the switching control node, the session continuity function being configured to control session transfer operations between a packet switched network access and a circuit switched network access; and
    a packet switched network control function separate from the switching control node and uniquely assigned to the switching control node;
    wherein the switching control node is configured to handle emergency sessions established from the user equipment via the circuit switched network access, and the packet switched network control function is configured to handle emergency sessions established from a user equipment via the packet switched network access;
    wherein the switching control node includes an interface with respect to an emergency answering point;
    wherein the packet switched network control function is configured to forward to the switching control node, handling of the emergency sessions established via the packet switched network access; and
    wherein the switching control node is configured to identify the emergency answering point on the basis of the location of the user equipment, and to establish a connection between the user equipment and the emergency answering point via said interface of the switching control node.

2. The network component according to claim 1, wherein the packet switched network control function is an Emergency Call Session Control Function of an IP Multimedia Subsystem network.

3. The network component according to claim 1, wherein the switching control node is a Mobile Switching Centre of a mobile network.

4. The network component according to claim 1, comprising:
a memory configured to store an address identifier of the switching control node to which the packet switched network control function is assigned.

5. A method for emergency session handling in a communication network, comprising:
assigning a packet switched network control function to a switching control node of a circuit switched network, wherein the packet switched network control function is configured to handle emergency sessions established from a user equipment via a packet switched network access, and the switching control node is configured to handle emergency sessions established from the user equipment via a circuit switched network access;
forwarding handling of a first emergency session established from the user equipment via the packet switched network access from the packet switched network control function to the switching control node, wherein said forwarded handling by the switching control node includes identifying an emergency answering point on the basis of the location of the user equipment; and
establishing a leg of the first emergency session from the switching control node to the emergency answering point, wherein the first emergency session thereby provides a connection between the user equipment and the emergency answering point via the packet switched network access and the switching control node;
establishing a second emergency session from the user equipment via the circuit switched network access to the switching control node;
associating, in the switching control node, the first emergency session with the second emergency session, wherein the switching control node identifies the first emergency session on the basis of a session transfer identifier transmitted with a session transfer request from the user equipment to the switching control node, wherein the session transfer identifier is of a type dedicated for emergency sessions; and
performing a session transfer operation by connecting to the second emergency session, the established leg extending from the switching control node to the emergency answering point.

6. The method according to claim 5, comprising:
storing information relating to the emergency session in a database associated with the switching control node.

7. The method according to claim 5, wherein the packet switched network access is provided by an IP Multimedia Subsystem network.

8. The method according to claim 5, wherein the switching control node is a Mobile Switching Centre of a mobile network.

9. A method for emergency session handling in a communication network, comprising:
assigning a packet switched network control function to a switching control node of a circuit switched network, wherein the packet switched network control function is configured to handle emergency sessions established from a user equipment via a packet switched network access, and the switching control node is configured to handle emergency sessions established from the user equipment via a circuit switched network access;
establishing a first emergency session between the user equipment and an emergency answering point via the circuit switched network access and the switching control node, the first emergency session including a leg established from the switching control node to the emergency answering point;
establishing a second emergency session from the user equipment via the packet switched network access to the switching control node;
associating, in the switching control node, the first emergency session with the second emergency session, wherein the switching control node identifies the first emergency session on the basis of a session transfer identifier transmitted with a session transfer request from the user equipment to the switching control node, wherein the session transfer identifier is of a type dedicated for emergency sessions; and
performing a session transfer operation by connecting to the second emergency session, the established leg extending from the switching control node to the emergency answering point.

* * * * *